US011833974B2

(12) United States Patent
Kajimoto

(10) Patent No.: US 11,833,974 B2
(45) Date of Patent: Dec. 5, 2023

(54) VIDEO SIGNAL PROCESSING APPARATUS

(71) Applicant: DENSO TEN Limited, Kobe (JP)

(72) Inventor: Nobuaki Kajimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 108 days.

(21) Appl. No.: 17/568,525

(22) Filed: Jan. 4, 2022

(65) Prior Publication Data

US 2022/0410807 A1 Dec. 29, 2022

(30) Foreign Application Priority Data

Jun. 25, 2021 (JP) ................................ 2021-106116

(51) Int. Cl.

*B60R 1/26* (2022.01)
*B60W 50/14* (2020.01)
*B60W 50/04* (2006.01)

(52) U.S. Cl.

CPC ............ *B60R 1/26* (2022.01); *B60W 50/045* (2013.01); *B60W 50/14* (2013.01); *B60R 2300/105* (2013.01); *B60R 2300/8066* (2013.01); *B60W 2050/146* (2013.01)

(58) Field of Classification Search

CPC ...... B60R 1/20-31; B60R 2300/00-80; B60R 1/26; B60R 2300/105; B60R 2300/8066; B60R 2300/70; B60R 1/22; B60W 50/14; B60W 2050/146; B60W 50/045; B60W 2420/42

See application file for complete search history.

(56) References Cited

U.S. PATENT DOCUMENTS 6,421,094 B1 * 7/2002 Han ...................... H04N 11/20 348/557
2005/0190262 A1 * 9/2005 Hamdan ............. G07C 5/0891 348/E7.086
2017/0088048 A1 * 3/2017 Iwamoto .................. B60R 1/00

FOREIGN PATENT DOCUMENTS

JP 2014-197370 A 10/2014

* cited by examiner

*Primary Examiner* — John W Miller
*Assistant Examiner* — Humam M Satti
(74) *Attorney, Agent, or Firm* — Oliff PLC

(57) ABSTRACT

A video signal processing apparatus according to an embodiment includes a controller. The controller receives (i) a plurality of video signals from a plurality of video sources including a camera and (ii) a specifying signal that specifies which one of the video signals is to be output to a display apparatus. The controller changes a wait time from an input of the specifying signal to an output of the video signal specified by the specifying signal to the display apparatus based on which one of the plurality of the video sources corresponds to the video signal specified by the specifying signal.

7 Claims, 4 Drawing Sheets

VIDEO SIGNAL PROCESSING APPARATUS

BACKGROUND OF THE INVENTION

Field of the Invention

The invention relates to a video signal processing apparatus and a video signal processing method.

Description of the Background Art

Conventionally, there has been a technology that displays a video signal to be input from a plurality of video sources, such as cameras including a rear camera, and an image drawing apparatus that draws a navigation image, on a display apparatus (for example, refer to Japanese Published Unexamined Patent Application No. 2014-197370).

By the way, when there is the plurality of the video sources, there is a case in which one output timing of a video signal is matched with the other output timing of a last output video signal. However, if it waits for the output timing of the last output signal, for example, when an image from a camera is requested to be displayed immediately, such a request may not be satisfied.

SUMMARY OF THE INVENTION

According to one aspect of the invention, a video signal processing apparatus according to an embodiment includes a controller. The controller receives (i) a plurality of video signals from a plurality of video sources including a camera and (ii) a specifying signal that specifies which one of the video signals is to be output to a display apparatus. The controller changes a wait time from an input of the specifying signal to an output of the video signal specified by the specifying signal to the display apparatus based on which one of the plurality of the video sources corresponds to the video signal specified by the specifying signal.

It is an object of the invention to provide a video signal processing apparatus and a video signal processing method capable of appropriately outputting a video signal based on a video source.

These and other objects, features, aspects and advantages of the invention will become more apparent from the following detailed description of the invention when taken in conjunction with the accompanying drawings.

DESCRIPTION OF THE EMBODIMENTS

A video signal processing apparatus and a video signal processing method according to an embodiment of the invention will be described below with reference to the drawings. The invention is not limited to the embodiment described below.

Figure 1:
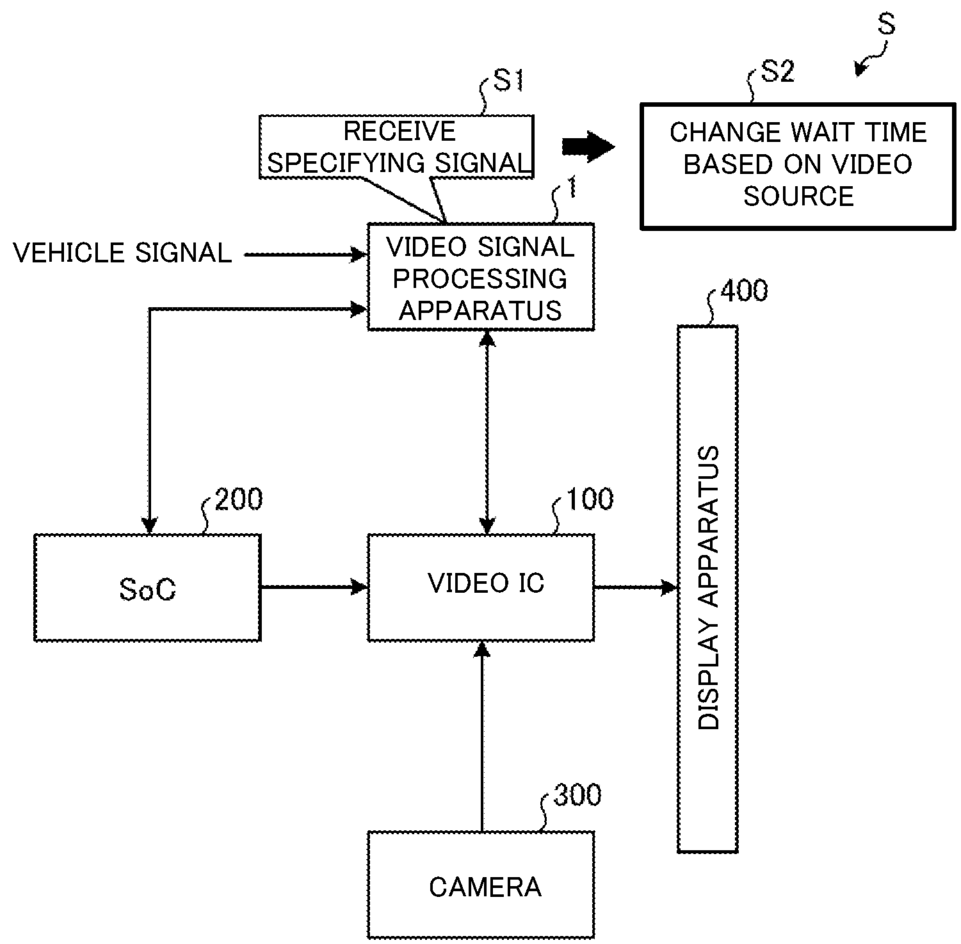
FIG. 1 illustrates an outline of a video signal processing method according to an embodiment.

First, an outline of the video signal processing method according to the embodiment will be described with reference to FIG. 1. FIG. 1 illustrates the outline of the video signal processing method according to the embodiment. The video signal processing method according to the embodiment is executed by a video signal processing apparatus 1 illustrated in FIG. 1. FIG. 1 illustrates a video signal processing system S including the video signal processing apparatus 1. The video signal processing system S may be configured as a navigation apparatus, for example.

As illustrated in FIG. 1, the video signal processing system S includes the video signal processing apparatus 1, a video IC (Integrated Circuit) 100, an SoC (System on a Chip) 200, a camera 300, and display apparatus 400.

The video IC 100 is connected to the SoC 200 and the camera 300 as video sources and outputs video signals, such as an image drawn by the SoC 200, an image from the camera 300, and the like, to the display apparatus 400. The video IC 100 outputs the video signals using an LVDS (Low Voltage Differential Signaling).

Although the video IC 100 outputs the video signals to the display apparatus 400 at an output timing instructed by the video signal processing apparatus 1, this will be described later.

The SoC 200 has a function for drawing various images. Examples of the images include various images of the navigation apparatus (setting images, map images, etc.), audio setting images, guide lines (vehicle width lines) superimposed on an image from a camera, and the like.

The SoC 200 outputs the drawn images to the video IC 100 as the video signals.

The camera 300 is, for example, a camera mounted on a vehicle. The camera 300 captures images around the vehicle and outputs the captured images to the video IC 100 as the video signals. Examples of the camera 300 include a rear camera that captures a rear image of the vehicle, a front camera that captures a front image of the vehicle, a side camera that captures a side image of the vehicle, and the like. The image from the camera 300 may be an analog image or a digital image.

The display apparatus 400 is, for example, a liquid crystal display, such as a TFT (This-Film-Transistor) liquid crystal display. The display apparatus 400 displays the video signals output from the video IC 100 as videos.

The video signal processing apparatus 1 executes the video signal processing method to determine the output timing of the video signals from the video IC 100 to the display apparatus 400 and instructs the video IC 100 to output the video signals when the output timing arrives.

Specifically, in the video signal processing method according to the embodiment, first, the video signal processing apparatus 1 receives a plurality of the video signals from a plurality of video sources and receives a specifying signal that specifies which one of the video signals is to be output from the video IC 100 to the display apparatus 400 (a step S1).

In an example shown in FIG. 1, the specifying signal is a vehicle signal or an input signal from the SoC 200. For example, when a reverse signal indicating that a shift lever is shifted to a reverse position is input as the vehicle signal, the video signal processing apparatus 1 receives a video signal from the rear camera (camera 300), that is, specification of the image from the camera, as the specifying signal.

When the video signal processing apparatus 1 receives an output request of the image from the SoC 200, the video signal processing apparatus 1 receives specification of the image from the SoC 200 as the specifying signal.

The video signal processing apparatus 1 changes a wait time from an input of the specifying signal to an output of the video signal to the display apparatus 400 based on which one of the plurality of the video sources corresponds to the video signal specified by the specifying signal (a step S2).

For example, when the video source corresponding to the video signal specified by the specifying signal is the camera 300, the video signal processing apparatus 1 sets a first time as the wait time, and when the video source corresponding to the video signal specified by the specifying signal is the SoC 200, the video signal processing apparatus 1 sets a second time longer than the first time as the wait time. This is because a time required for the camera 300 to output the image is shorter than a time required for the SoC 200 to draw the image because the camera 300 outputs the image unchanged.

When the set wait time elapses, the video signal processing apparatus 1 determines that it is the output timing and instructs the video IC 100 to output the video signal.

As a result, for example, since the wait time for the image from the camera 300 is shortened, a time from receiving the input of the specifying signal to displaying the image from the camera 300 on the display apparatus 400 is shortened. On the other hand, a video signal from the SoC 200 that requires time to draw the image is output after the output of the video signal is prepared (an image drawing is completed).

That is, according to the video signal processing method according to the embodiment, it is possible to appropriately output the video signal based on the video source.

Although the video signal processing apparatus 1 changes the wait time based on types of the cameras 300, such as whether the camera 300 is the rear camera or not, whether the image from the camera 300 is a digital image or an analog image, and the like, the details will be described later.

Furthermore, FIG. 1 shows an example in which the video signal processing apparatus 1 is configured separately from the video IC 100. However, the video signal processing apparatus 1 may be configured integrally with the video IC 100. In this case, the video signal processing apparatus 1 and the video IC 100 may be integrally configured as the video IC 100 having a function of the video signal processing apparatus 1 or the video signal processing apparatus 1 having a function of the video IC 100.

Figure 2:
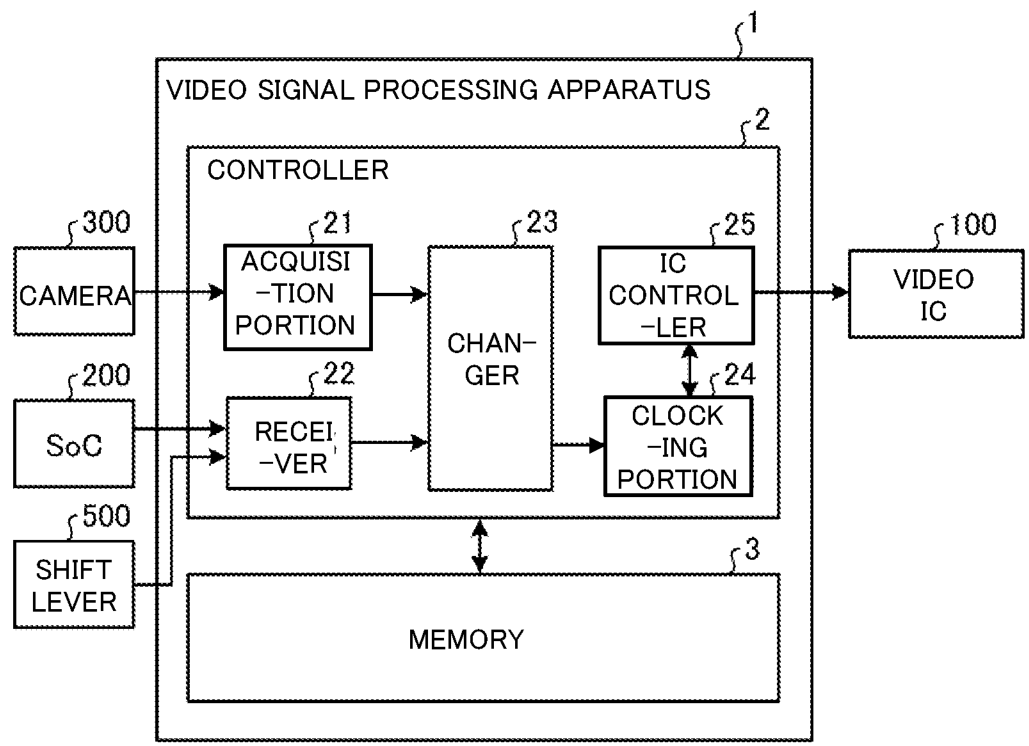
FIG. 2 is a block diagram illustrating a configuration of a video signal processing apparatus according to the embodiment.

Next, a configuration of the video signal processing apparatus 1 according to the embodiment will be described with reference to FIG. 2. FIG. 2 is a block diagram illustrating the configuration of the video signal processing apparatus 1 according to the embodiment. As illustrated in FIG. 2, the video signal processing apparatus 1 according to the embodiment is connected to the video IC 100, the SoC 200, the camera 300, and a shift lever 500.

The shift lever 500 is one example of an equipment that outputs the vehicle signal and outputs the vehicle signal to the video signal processing apparatus 1 based on a shift position. Examples of the equipment that outputs the vehicle signal include an activation switch of the camera 300, a blinker (an activation switch of the side camera), and the like, apart from the shift lever 500.

As illustrated in FIG. 2, the video signal processing apparatus 1 according to the embodiment includes a controller 2, and a memory 3. The controller 2 includes an acquisition portion 21, a receiver 22, a changer 23, a clocking portion 24, and an IC controller 25. The memory 3 stores various information.

Here, the video signal processing apparatus 1 includes a computer having, for example, a CPU (Central Processing Unit), a ROM (Read Only Memory), a RAM (Random Access Memory), a data flash, an input/output port, and the like, and various circuits.

Here, the CPU of the computer reads out and executes a program stored in the ROM, for example, so as to function as the acquisition portion 21, the receiver 22, the changer 23, the clocking portion 24, and the IC controller 25 of the controller 2.

At least one or all of the acquisition portion 21, the receiver 22, the changer 23, the clocking portion 24, and the IC controller 25 of the controller 2 may be constituted of hardware such as an ASIC (Application Specific Integrated Circuit) and an FPGA (Field Programmable Gate Array). An internal configuration of the controller 2 is not limited to the configuration illustrated in FIG. 2, and may be another configuration as long as it is a configuration to perform processing described later. For example, the changer 23 may perform an entirety or a part of the processing described later for other portions other than the changer 23.

The memory 3 corresponds to the RAM and/or the data flash, for example. The RAM and the data flash are able to store various program information, and the like. The video signal processing apparatus 1 may acquire the above-mentioned program and various information via another computer connected to the video signal processing apparatus 1 by using a wired/wireless network, or a portable recording medium.

Next, each function (the acquisition portion 21, the receiver 22, the changer 23, the clocking portion 24, and the IC controller 25) of the controller 2 will be described.

The acquisition portion 21 acquires various information. For example, the acquisition portion 21 acquires information about the types of the camera 300. The types of the camera 300 include the rear camera, the side camera, the front camera, and the like. The types of the camera 300 include types of the images (digital image, analog image) from the camera. The acquisition portion 21 outputs the acquired information to the changer 23.

The receiver 22 receives the plurality of the video signals from the plurality of the video sources and receives the specifying signal that specifies which one of the video signals is to be output from the video IC 100 to the display apparatus 400.

For example, when the vehicle signal as the reverse signal is input from the shift lever 500, the receiver 22 receives the specifying signal indicating an output of the video signal (image) from the camera 300 (rear camera) to the display apparatus 400. Thus, by receiving the specifying signal by the vehicle signal, a special equipment that receives the specifying signal is not necessary, so that costs can be reduced.

When the signal indicating an output of the image from the SoC 200 is input, the receiver 22 receives the specifying signal indicating the output of the video signal (image) from the SoC 200 to the display apparatus 400. When the receiver 22 receives the specifying signal, the receiver 22 notifies information of the video source corresponding to the video signal specified by the specifying signal to the changer 23.

When the receiver 22 receives the specifying signal, the changer 23 changes the wait time from the input of the specifying signal to the output of the video signal to the display apparatus 400 based on which one of the plurality of the video sources corresponds to the video signal specified by the specifying signal.

Here, the wait time includes a minimum required time (a wait time A shown in FIG. 3 and FIG. 4 described later) regardless of the video source and an additional time set according to the video source. The required time is a time required from the receipt of the input of the specifying signal (vehicle signal, etc.) by the receiver 22 to a determination of the video source corresponding to the video signal specified by the specifying signal.

The additional time is additionally set by the changer 23 according to the video source. For example, when the video source corresponding to the video signal specified by the specifying signal is the camera 300, the changer 23 sets a first additional time. When the video source corresponding to the video signal specified by the specifying signal is the SoC 200, the changer 23 sets a second additional time longer than the first additional time.

That is, the changer 23 makes the wait time when the camera 300 is the video source corresponding to the video signal specified by the specifying signal shorter than the wait time when one of the plurality of the video sources other than the camera 300 is the video source corresponding to the video signal specified by the specifying signal. As a result, it is possible to immediately display the image from the camera 300 and to display the image from the SoC 200 after the image drawing is completed.

When the plurality of the video sources includes a plurality of different cameras 300 (rear camera, side camera, front camera), the changer 23 changes the wait time based on the types of a plurality of the cameras 300.

For example, the changer 23 makes the wait time when the rear camera is the video source corresponding to the video signal specified by the specifying signal shorter than the wait time when one of the plurality of the cameras other than the rear camera is the video source corresponding to the video signal specified by the specifying signal. As a result, it is possible to output the image from the rear camera when the shift lever 500 is shifted to the reverse position. Thus, a driver can move rearward while checking the image from the rear camera just after shifting the shift lever 500 to the reverse position.

The changer 23 makes the wait time when the image from the camera 300 as the video source corresponding to the video signal specified by the specifying signal is a digital image shorter than the wait time when the image from the camera 300 is an analog image. This is because a time until an output of the digital image is prepared by the video IC 100 is shorter than a time until an output of the analog image is prepared by the video IC 100. As described above, it is possible to appropriately set the wait time based on the types of the images from the camera 300.

The changer 23 sets a timer of the clocking portion 24 for the set wait time and starts counting of the timer.

The clocking portion 24 has a timer function for measuring time. The clocking portion 24 measures the wait time set by the changer 23 and notifies a timing after a lapse of the wait time to the IC controller 25.

The IC controller 25 controls the output timing of the video signal output by the video IC 100 based on the wait time set by the changer 23.

Specifically, when the IC controller 25 is notified of a timing signal indicating the lapse of the wait time from the clocking portion 24, the IC controller 25 determines that it is the output timing of the video signal and instructs the video IC 100 to output the video signal. For example, when the video IC 100 outputs the video signal using the LVDS, the IC controller 25 turns on the LVDS.

Figure 3:
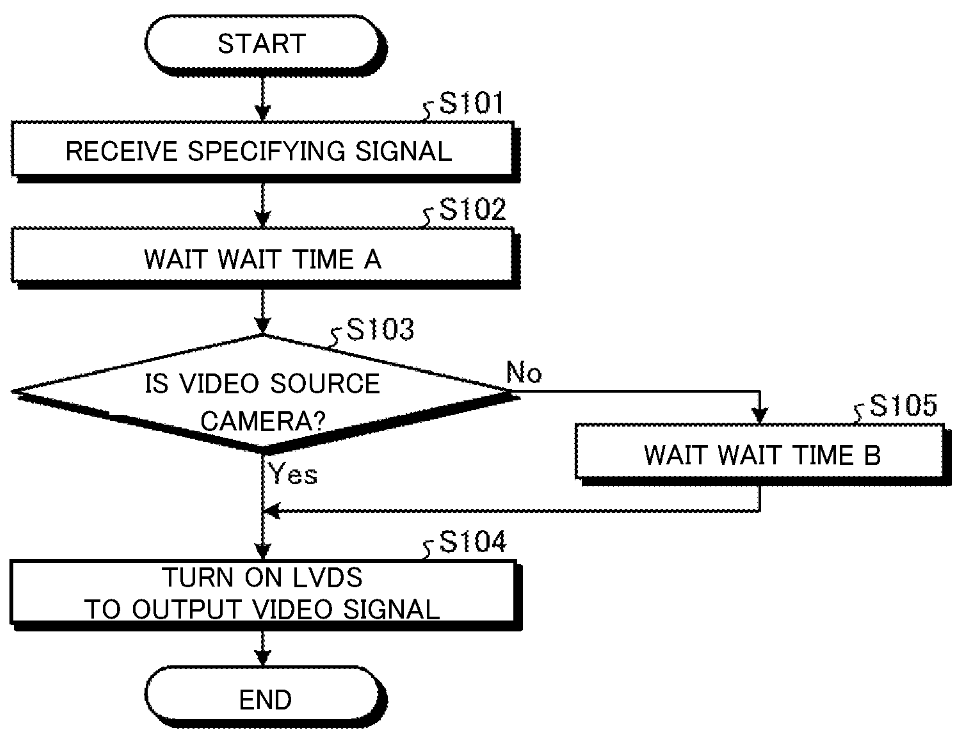
FIG. 3 is a flowchart illustrating a first processing procedure executed by the video signal processing apparatus according to the embodiment.
Figure 4:
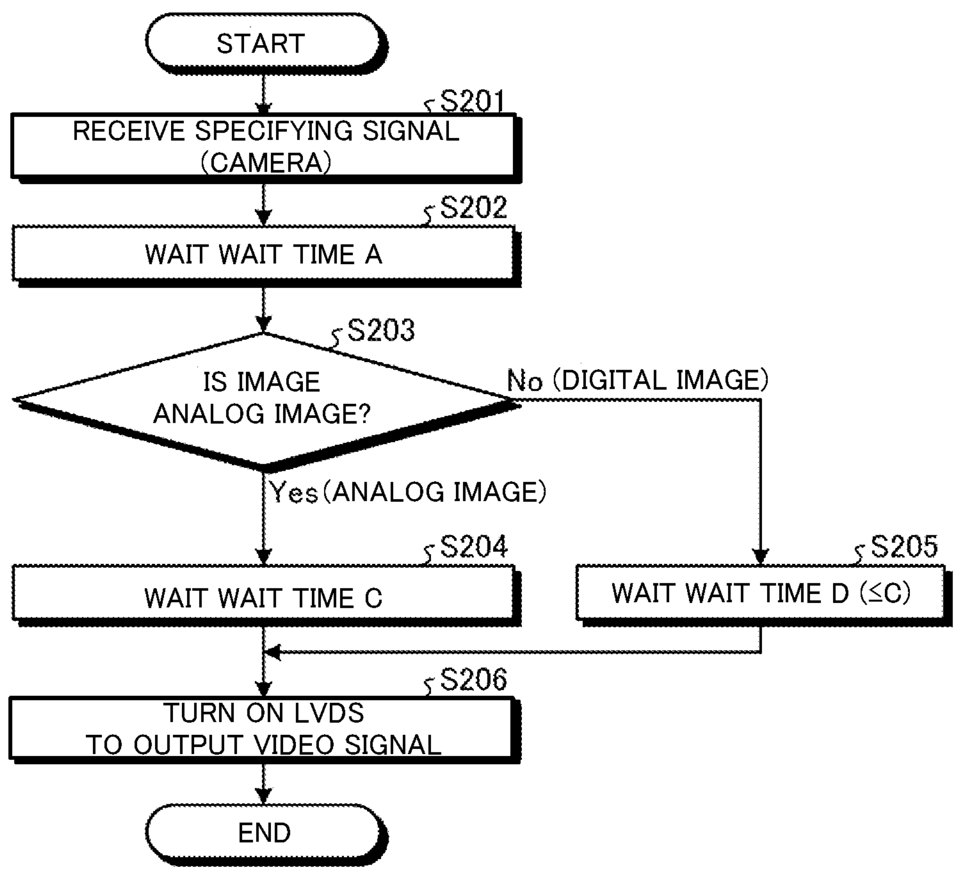
FIG. 4 is a flowchart illustrating a second processing procedure executed by the video signal processing apparatus according to the embodiment.

Next, processing procedures executed by the video signal processing apparatus 1 according to the embodiment will be described with reference to FIG. 3 and FIG. 4. FIG. 3 is a flowchart illustrating a first processing procedure executed by the video signal processing apparatus 1 according to the embodiment. FIG. 4 is a flowchart illustrating a second processing procedure executed by the video signal processing apparatus 1 according to the embodiment.

First, a process shown in FIG. 3 will be described. FIG. 3 shows the process of changing the wait time according to whether or not the video source corresponding to the video signal specified by the specifying signal is the camera 300. As illustrated in FIG. 3, the receiver 22 first receives the input of the specifying signal (a step S101).

Subsequently, after receiving the input of the specifying signal, the IC controller 25 waits a wait time A (a step S102). The wait time A is a time required for all video sources.

Subsequently, after a lapse of the wait time A, the changer 23 determines whether or not the video source corresponding to the video signal specified by the specifying signal is the camera 300 (a step S103).

When the video source corresponding to the video signal specified by the specifying signal is the camera 300 (Yes in the step S103), the changer 23 sets the wait time to zero. The IC controller 25 turns on the LVDS of the video IC 100 to output the video signal (a step S104) and ends the process.

On the other hand, when the video source corresponding to the video signal specified by the specifying signal is the SoC 200 (No in the step S103), the changer 23 sets the wait time B. The IC controller 25 waits the wait time B (a step S105) and moves to the step S104.

Next, a process shown in FIG. 4 will be described. FIG. 4 shows the process of changing the wait time based on the types of the camera 300. As illustrated in FIG. 4, the receiver 22 first receives the specifying signal that specifies the image from the camera 300 (a step S201).

Subsequently, the IC controller 25 waits the wait time A after receiving the specifying signal (a step S202). The wait time A is a necessary time for all video sources.

Subsequently, after the lapse of the wait time A, the changer 23 determines whether the image from the camera 300 as the video source corresponding to the video signal specified by the specifying signal is a digital image or an analog image (a step S203).

When the image from the camera 300 is an analog image (Yes in the step S203), the changer 23 sets a wait time C and the IC controller 25 waits the wait time C (a step S204).

On the other hand, when the image from the camera 300 is a digital image (No in the step S203), the changer 23 sets a wait time D and the IC controller 25 waits the wait time D (a step S205). The wait time D is shorter than the wait time C.

After the lapse of the wait time, the IC controller 25 turns on the LVDS of the video IC 100 to output the video signal (a step S206) and ends the process.

As described above, the video signal processing apparatus 1 according to the embodiment includes the controller 2. The controller 2 receives the plurality of the video signals from the plurality of the video sources including the camera 300 and receives the specifying signal that specifies which one of the video signals is to be output to the display apparatus 400. The controller 2 changes the wait time from the input of the specifying signal to the output of the video signal to the display apparatus 400 based on which one of the plurality of the video sources corresponds to the video signal specified by the specifying signal. As a result, it is possible to appropriately output the video signal based on the video source.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A video signal processing apparatus comprising:

a controller that receives (i) a first video signal from a first video source that includes a camera and a second video signal from a second video source, and (ii) a specifying signal that specifies which one of the first and second video signals is to be output to a display apparatus, the controller being configured to: (a) determine whether the first video signal from the first video source or the second video signal from the second video source is specified by the specifying signal, (b) set a wait time from an input of the specifying signal to an output of the video signal specified by the specifying signal to the display apparatus to a first wait time when the first video signal from the first video source is determined to have been specified by the specifying signal, and (c) set the wait time from the input of the specifying signal to the output of the video signal specified by the specifying signal to the display apparatus to a second wait time that is longer than the first wait time when the second video signal from the second video source is determined to have been specified by the specifying signal.

2. The video signal processing apparatus according to claim 1, wherein the specifying signal received by the controller is a vehicle control signal that controls a vehicle in which the video signal processing apparatus is installed.

3. The video signal processing apparatus according to claim 1, wherein the second video source does not include any camera.

4. The video signal processing apparatus according to claim 1, wherein the second video source includes a second camera that is a different type of camera than the camera of the first video source.

5. The video signal processing apparatus according to claim 4, wherein the camera of the first video source is a rear camera that captures a rear image behind a vehicle in which the video signal processing apparatus is mounted, and the second camera of the second video source is a camera other than the rear camera.

6. The video signal processing apparatus according to claim 1, wherein the camera outputs a digital image.

7. A video signal processing method comprising the steps of:

(a) receiving, by a controller, (i) a first video signal from a first video source that includes a camera and a second video signal from a second video source, and (ii) a specifying signal that specifies which one of the first and second video signals is to be output to a display apparatus;

(b) determining, by the controller, whether the first video signal from the first video source or the second video signal from the second video source is specified by the specifying signal;

(c) setting, by the controller, a wait time from an input of the specifying signal to an output of the video signal specified by the specifying signal to the display apparatus to a first wait time when the first video signal from the first video source is determined to have been specified by the specifying signal; and (d) setting, by the controller, the wait time from the input of the specifying signal to the output of the video signal specified by the specifying signal to the display apparatus to a second wait time that is longer than the first wait time when the second video signal from the second video source is determined to have been specified by the specifying signal.

* * * * *